INVENTOR
Paul A. Tierney.
BY Charles J. Boas
ATTORNEY

United States Patent Office 3,078,186
Patented Feb. 19, 1963

3,078,186
CERAMIC POTTING COMPOSITION AND METHOD OF ENCAPSULATING AN ELECTRICAL ARTICLE THEREWITH
Paul A. Tierney, Monroeville, Pa., assignor to Westinghouse Electric Corporation, East Pittsburgh, Pa., a corporation of Pennsylvania
Filed July 26, 1960, Ser. No. 45,392
6 Claims. (Cl. 117—201)

This invention relates to a ceramic composition composed of inorganic materials for use in potting or encapsulating electrical members. This invention has particular reference to electrical members potted or encapsulated in a ceramic potting composition adapted to withstand temperatures of about 500° C. and higher.

For many applications, it is necessary that electrical members be protected by a completely enclosing, insulating structure. Organic potting compositions are used widely in the electrical industry for completely sealing or encapsulating electrical members. In general, such organic encapsulating materials are not capable of withstanding, for long periods of time, temperatures substantially above 200° C.

There is need in the electrical industry for an encapsulating or potting composition which, after application, will provide an encapsulated electrical member capable of operating satisfactorily for relatively long periods of time at temperatures of about 500° C. and higher.

This invention is directed to a ceramic potting or encapsulating composition comprised of inorganic materials for use in sealing or encapsulating electrical members such as transformers, motors, control coils, and the like.

Figure 1:
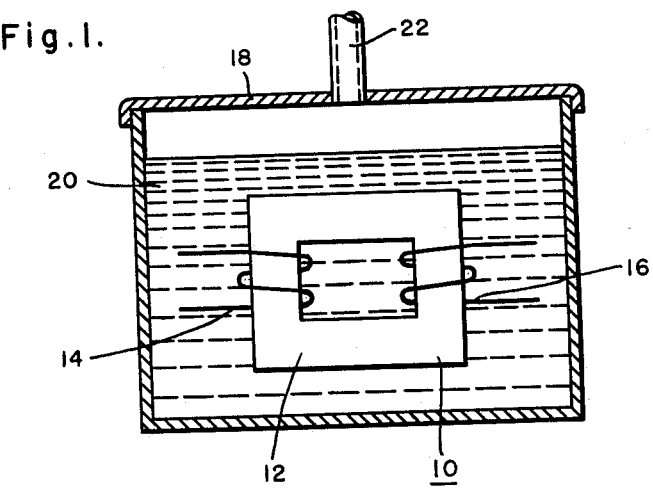
Figure 2:
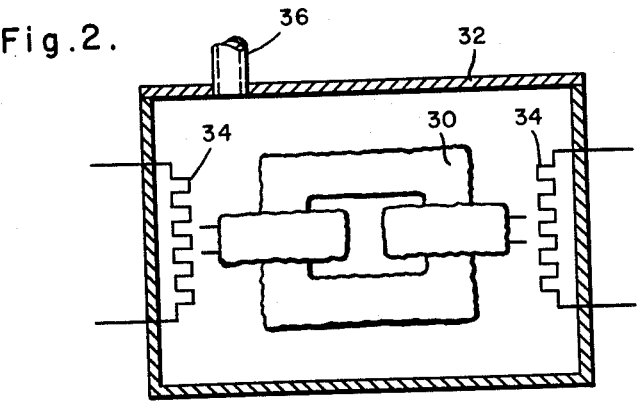

For a complete understanding of the nature of this invention reference is made to the following detailed description taken in conjunction with the accompanying drawing, wherein:

FIGURE 1 is a front view, in cross-section, of a transformer in an impregnating tank; and FIG. 2 is a front view, in cross-section, of a transformer in a baking oven, the transformer being ensapsulated in accordance with this invention.

In accordance with this invention there is provided an inorganic or ceramic type encapsulating or potting composition adapted for sealing or encapsulating electrical members so as to provide encapsulated electrical members capable of operating satisfactorily for long periods of time at temperatures of about 500° C. and higher.

The potting composition of this invention comprises an intimate admixture of (1) from about 70% to 80% by weight of a specific cement component (to be detailed hereinafter) in finely divided form and (2) from about 30% to 20% by weight of a low melting point lead-borate glass in finely divided form.

The cement component (1) consists of (a) from about 90% to 85% by weight of a refractory material in finely divided form and (b) from about 10% to 15% by weight of a binder composition in finely divided form.

The refractory material (a) should contain from about 15% to 40% by weight of $SiO_2$. The available $SiO_2$ can be present as such or in the form of a silicate. Thus, the refractory material suitable for use in this invention includes silicates such as calcium silicate, barium silicate, magnesium silicate, titanium silicate, hafnium silicate, zirconium silicate, aluminum silicate and mixtures of two or more. The aluminosilicates such as calcium aluminosilicate, magnesium aluminosilicate and the like can also be used as the refractory material alone or in admixture with the above listed silicates.

The refractory aluminates, such as calcium aluminate and magnesium aluminate, in admixture with silica ($SiO_2$) can be employed satisfactorily as the refractory material. If such mixtures are used the amount of silica employed should be from about 10% to 40% by weight of the total weight of the admixture.

The preferred binder composition (b) consists essentially of, by weight, from about 25% to 50% of magnesium oxide (MgO) and from 75% to 50% of ammonium dihydrogen phosphate ($NH_4H_2PO_4$). Other binders that can be used include the inorganic type binder materials such as a solution of aluminum dihydrogen phosphate, collodial dispersions of certain oxides such as alumina, silica and zirconia. Ethyl silicate can be used as a binder.

The lead-borate glass component (2) of the ceramic potting composition consists essentially of, by weight, from about 10% to 20% of boron oxide ($B_2O_3$) and from about 90% to 80% of lead oxide (PbO). Such lead-borate glasses will usually begin to soften at a temperature of from about 250° C. to 325° C.

The lead-borate glass is prepared by heating in a suitable vessel to fusion the desired amount of boron oxide and lead oxide. Fusion temperature is from about 500° C. to 600° C. The resulting glass composition, after cooling to room temperature, is pulverized into finely divided particles in a ball-mill or like apparatus. Lead-borate glasses of the above compositions are available commercially.

The inorganic or ceramic potting composition of this invention is preferably applied to the electrical member in the form of a slurry. A water-alcohol mixture comprising, by weight, from about 40 to 60 parts of distilled water and from about 60 to 40 parts of alcohol in an amount of from about 10% to 20% by weight, based on the total weight of the potting composition, is admixed with the potting composition to provide a usable slurry. Suitable alcohols include methanol, ethanol, propanol, isopropanol, and mixtures of two or more. More or less water-alcohol mixture can be employed to vary the consistency of the slurry as desired. Excessive amounts of water-alcohol mixture, however, will render the resulting coating of the potting composition weak and porous and should be avoided. Water alone can be employed to provide a slurry. However, the water-alcohol mixture is preferred in that it substantially increases the set time.

An intimate admixture of the various ingredients that comprise the potting composition can be prepared by placing the desired amount of ingredients in a ball-mill, and ball-milling the ingredients for about one hour. It is preferred to employ the ingredients as finely divided particles of the order of about 100 mesh fineness and finer.

The following examples are illustrative of the potting compositions of this invention:

*Example I*

Seventeen-hundred and fifty parts by weight of a cement component consisting of, by weight, 85% of zirconium silicate, 7.5% of magnesium oxides, and 7.5% of ammonium dihydrogen phosphate are thoroughly admixed with 250 parts by weight of lead-borate glass consisting of 15% by weight of boron oxide and 85% by weight of lead oxide to provide a powdered mixture. Three-hundred and forty parts by weight of a mixture of 11 parts by weight of distilled water and 7 parts by weight of ethanol are admixed with the powdered mixture to produce usable slurry.

*Example II*

Seventeen-hundred and fifty parts by weight of a cement component consisting of, by weight, 88% of aluminum silicate, 6% of magnesium oxide, and 6% of ammonium dihydrogen phosphate are thoroughly admixed with 240 parts by weight of lead-borate glass consisting of, by weight, 15% of boron oxide and 85% of lead oxide to provide a powdered mixture. Three-hundred and forty parts by weight of a mixture of 11 parts by weight of distilled water and 7 parts by weight of ethanol are admixed with the powdered mixture to provide a usable slurry.

*Example III*

Seventeen hundred parts by weight of a cement component consisting of, by weight, 90% of calcium silicate, 5% of magnesium oxide, and 5% of ammonium dihydrogen phosphate are thoroughly admixed with 220 parts by weight of a lead-borate glass consisting of, by weight, 17% boron oxide and 83% of lead oxide to provide a powdered mixture. Three hundred parts by weight of distilled water are admixed with the powdered mixture to provide a workable slurry.

*Example IV*

Seventeen hundred and fifty parts by weight of a cement component consisting of, by weight, 85% of calcium aluminosilicate and 15% of aluminum dihydrogen phosphate are thoroughly admixed with 250 parts by weight of lead-borate glass consisting of 15% by weight of boron oxide and 85% by weight of lead oxide to provide a powdered mixture. Three-hundred and forty parts by weight of the alcohol-water mixture of Example I are admixed with the powdered mixture to provide a workable slurry for use in carrying out this invention.

The invention now will be described with particular reference to the insulating of an electrical transformer employing the ceramic composition of Example I.

Referring to FIG. 1 of the drawing there is shown a transformer 10 having a magnetic core 12 and coils 14 positioned within a tank 16. The coils 14 are formed by wrapping around a magnetic core 12 the desired number of turns of electrical wire conductor coated with insulating material capable of withstanding temperatures of 500° C. and higher. A particularly suitable insulating material and method of application thereof is disclosed in application Serial No. 857,894, filed the 7th day of December 1959, and assigned to the assignee of the present invention.

In accordance with the disclosure of application Serial No. 857,894 referred to above, a metallic electrical conductor such, for example, as copper, aluminum and silver, is provided with a tough, flexible, abrasion resistant coating comprising an organic resin component and an inorganic insulating material. The metallic conductor with the applied coating is then formed into its desired shape as, for example, by wrapping it about magnetic core 12 to provide coils 14. The metallic conductor is subsequently heated to a temperature at which the organic portion of the coating is decomposed or volatilized and is substantially all removed from the applied coating. The coated metallic conductor is subjected to additional heat treatment whereby the metallic conductor is provided with an adherent inorganic insulating coating.

The organic-inorganic coating composition disclosed in application Serial No. 857,894 comprises certain inorganic insulating materials in finely divided form suspended in a solution of an organic resin.

The organic resin component employed in the organic-inorganic coating composition includes those polymeric resins which, in admixture with the inorganic portion of the coating composition, will form a tough, flexible abrasion resistant coating on the metallic conductor. Further, the resinous material must, upon heating to its decomposition temperature, be clean-burning. That is, the organic material, upon heating to its decomposition temperature must be substantially all removed by volatilization from the applied coating, and must not leave any traces of carbon residue on the resulting inorganic insulating coating. It will be apparent that any carbon residue on the insulating coating is undesirable since carbon is an electrically conducting material.

It is to be understood that any organic resin meeting the above requirements can be employed satisfactorily. Certain specific polyester resins meet the above requirements and these have been employed satisfactorily in carrying out this invention. The polyester resins employed decompose and are substantially completely removed from the applied coating at temperatures of from about 425° C. to 460° C.

The specific polyester resins are prepared by reacting (A) one mol of a dicarboxylic acid component with (B) from about 1.2 mols to 1.5 mols of a mixture of polyhydric alcohols comprised of from (i) about 0.95 to 0.50 mol-fraction of at least one dihydric saturated aliphatic alcohol and (ii) from about 0.05 to 0.50 mol-fraction of at least one polyhydric saturated aliphatic alcohol having at least three reactive hydroxy groups per molecule. The reaction is preferably carried out in the presence of from 0.005 percent to 2 percent by weight, based on the total weight of the reactants, of an esterification catalyst. Suitable esterification catalysts are well known in the art and include metal salts of organic acids, metal oxides, and metal chelates.

The dicarboxylic acid component (A) employed in the preparation of the polyester can be isophthalic acid, dialkyl esters of isophthalic acid, dialkyl esters of terephthalic acid, and mixtures of two or more.

The dialkyl esters of terephthalic acid that can be employed include those esters in which the alkyl groups contain from 1 to 4 carbon atoms, for example, methyl, ethyl, propyl, isopropyl, butyl, isobutyl, and t-butyl. Dimethyl terephthalate and diethyl terephthalate are specific examples of dialkyl esters of terephthalic acid.

The dialkyl esters of isophthalic acid that can be employed include those esters in which the alkyl groups contain from 1 to 4 carbon atoms, for example, methyl, ethyl, propyl, isopropyl, butyl, isobutyl, and t-butyl. Dimethyl isophthalate, diethyl isophthalate, and diisopropyl isophthalate are specific examples of dialkyl esters of isophthalic acid.

Dihydric saturated alcohols (i) that comprise a portion of the mixture of polyhydric alcohols (B) which are suitable for preparing the polyesters comprise dihydric saturated aliphatic alcohols having from 2 to 8 carbon atoms per molecule. Examples of such alcohols include 1,2-ethanediol; 1,2-propanediol; 1,3-propanediol; 1,2-butanediol; 1,3-butanediol; 2,3-butanediol; 2-methylpropane-1,2-diol; 1,4-butanediol; and 1,6-hexanediol.

Examples of polyhydric saturated aliphatic alcohols (ii) having at least three reactive hydroxy groups which comprise the other portion of the mixture of polyhydric alcohols (B) include glycerol; 1,1,1-trimethylolpropane; 1,1,1-trimethylolethane; 1,2,3-butanetriol; erythritol; and pentaerythritol.

Highly satisfactory materials for use as the esterification catalyst in preparing the polyester include salts of organic acids selected from the group consisting of saturated and unsaturated aliphatic acids, cyclic acids, and aromatic acids. Examples of such catalysts include linolates, resinates, naphthenates, acetates, aromatic benzoates, octoates, tall oil acids, and stearates of metals including aluminum, calcium, cesium, chromium, cobalt, copper, lead, manganese, nickel, tin, titanium, vanadium, zinc, and zirconium. Two or more metal salts can be employed jointly as the catalyst. Other suitable catalysts, such for example as metal acetyl acetonates can be employed. Titanium acetyl acetonate is a specific example of such a catalyst. Other suitable catalysts include lead oxide, the oxides and carbonates of the alkali and alkaline earth metals including sodium carbonate, calcium oxide, and magnesium oxide.

The resinous polyesters can be prepared in accordance with usual esterification procedures as, for example, by heating a mixture of the acidic components, polyhydric alcohols and catalyst at a temperature of from about 150° C. to 250° C. In many cases, more complete esterification is obtained when the relatively low boiling point alcohol formed during the esterification reaction is removed by carrying out the esterification in the presence of an organic liquid such as m,p-cresol or the like, and by passing a sparging gas such as nitrogen or carbon dioxide through the reaction mixture.

For application to wire, the polyester is utilized in solution form. Thus, the polyester is dissolved in a suitable solvent. A suitable solvent is one comprising a mixture of cresols and hydrocarbons having a boiling point range of from about 135° C. to 250° C. together with certain monohydric alcohols. More specifically, mixtures of solvents comprising from 40% to 50% by weight of a phenol such as cresol or xylenol, or mixtures thereof, such as a mixture of phenol and cresol in equal parts can be combined with one or more of the following: ethanol, isopropanol, propanol, monochlorobenzene, xylol, toluol, and petroleum hydrocarbon distillates having boiling points within the range of from about 130° C. to 200° C. Ordinarily, the polyester solution employed will comprise from about 10 to 40 parts by weight of the polyester resin and from about 90 to 60 parts by weight of solvent.

The inorganic portions of the organic-inorganic coating composition consist of a refractory insulating material and a specific glass composition. Both the refractory material and the glass composition are preferably employed in finely divided form and particularly of the order of from 100 mesh to 500 mesh.

The refractory materials suitable for the preparation of the organic-inorganic coating material comprise the oxides and silicates of metals selected from the group consisting of calcium, barium, magnesium, titanium, cadmium, aluminum, zinc, lead, chromium and zirconium. Examples of such materials include alumina ($Al_2O_3$), silica ($SiO_2$), calcined clay, mica, zirconium silicate ($ZrSiO_4$), titania ($TiO_2$), zirconia ($ZrO_2$), chromium III oxide ($Cr_2O_3$), barium oxide (BaO), calcium oxide (CaO), magnesium oxide (MgO), and mixtures of two or more.

The glass composition employed in preparing the organic-inorganic coating composition falls within the following ranges of percentage composition by weight, viz: between 20% and 35% PbO, between 20% and 30% BaO, between 10% and 20% $B_2O_3$, between 5% and 20% $SiO_2$, between 4% and 10% CaO, and between 1% and 10% $Al_2O_3$. Any remaining ingredients in the glass composition will be in the form of impurities and will be restricted to below about 2%.

Preferred glass compositions fall within the following ranges of percentage composition by weight, viz: between 22% and 32% PbO, between 25% and 30% BaO, between 12% and 20% $B_2O_3$, between 8% and 19% $SiO_2$, between 5% and 8% CaO, and between 4% and 9% $Al_2O_3$.

The above glass compositions have sag points in excess of 500° C. hence will not soften and flow at operating temperatures of 500° C. and higher. However, upon heating to a temperature of about 700° C. the glass will readily fuse and coalesce.

To prepare finely divided particles of the above glass composition, ingredients in amounts necessary to provide the desired glass composition are placed in a suitable vessel, dry mixed and then heated to a temperature of from about 1000° C. to about 1100° C. at which temperature the ingredients fuse and form a homogenous molten glass mass. The molten mass of glass is then poured into water and the glass is shattered (the resulting product being known as "frit"). This frit is ball-milled either wet or dry to the desired particle size.

Glasses of the above compositions and their properties are disclosed in application Serial No. 847,911, filed October 22, 1959, now Patent No. 2,972,544. Reference is hereby made to the above application Serial No. 847,911, for a more complete description of the above glass compositions and their properties.

The organic-inorganic coating composition for use in this invention will comprise, by weight, from 40% to 60% of the organic resin component, from 20% to 40% of the refractory material, and from 10% to 30% of the specific glass composition. This coating composition is applied to the metallic conductor in the form of a liquid suspension. Thus, the desired amount of resin component and in particular the polyester resin above described is first dissolved in a suitable solvent therefor (preferred solvents are set forth hereinabove) and to this solution there are added the desired amounts of refractory material and glass in finely divided form. The resulting mixture is then ball-milled for a period of time of from about 12 hours to 48 hours. The resulting mixture or liquid suspension can be easily and readily applied to metallic wire conductors in conventional wire coating apparatus.

The following example is illustrative of a polyester resin for use in preparing the organic-inorganic coating composition:

Example V

Into a reaction vessel equipped with external heating means, stirrer, thermometer and nitrogen sparging tube with attached air condenser there are placed the following ingredients: 3400 grams of dimethylterephthalate, 3400 grams of dimethylisophthalate, 1355 grams of ethylene glycol, 2365 grams of 1,4-butanediol, 268 grams of glycerol, and 87.4 grams of titanium acetyl acetonate.

These ingredients are heated relatively fast with stirring and nitrogen gas sparging until the temperature of the reaction mass reaches about 160° C. Thereafter, the temperature of the reaction mass is increased slowly at a rate of about 20° C. per hour until the temperature of the reaction mass reaches 275° C. This temperature of 275° C. is maintained for about one hour and a viscous, thread-forming resin is obtained. The resin is then dissolved in 8750 milliliters of cresol and 5250 milliliters of xylene. The resulting resin varnish solution has a resin solids content of about 40%.

The following example is illustrative of the preparation of an organic-inorganic coating composition:

Example VI

One thousand two hundred and fifty (1250) parts by weight, of the resin solution of Example V are admixed with 300 parts by weight of 200 mesh silica ($SiO_2$) and 200 parts by weight of a glass composition comprising, by weight, 30.9% of PbO, 15.5% of $B_2O_3$, 7.2% of $Al_2O_3$, 25.8% of BaO, 15.5% of $SiO_2$, and 5.1% of CaO. This mixture is ball-milled for 48 hours. The resulting mixture or liquid suspension is further diluted with 2100 parts by weight of xylene and 700 parts by weight of cresol to provide a liquid suspension for application to a wire conductor.

A number 22 A.W.G. silver wire is passed through the liquid suspension and then passed through a vertical baking tower maintained at a temperature of about 430° C. at a rate of 28 feet per minute. The organic solvent is removed from the applied coating by evaporation in the baking tower. The resulting coating has a thickness of 1.9 mils and is smooth, hard, and adherent.

Reference is made to application Serial No. 875,894, filed December 7, 1959, for a more complete description and specific examples of the coating composition set forth above.

The tank 16 can be automatically sealed by a cover 18. The tank is filled with a slurry 20 of the hereinbefore described ceramic potting composition of Example I, and then is evacuated of air through line 22. The slurry 20 is vacuum impregnated into the interstices within the transformer 10. The vacuum is then released and the coated transformer is removed from tank 16 and allowed to air dry for a period of about 16 hours.

Thereafter the coated transformer 30 is placed in a baking oven 32 having heating elements 34 as shown in FIG. 2 of the drawing. The temperature in the oven is increased gradually from room temperature to about 450° C. over a period of about 6 to 10 hours. The potted transformer is left in the oven for about one and one-half hours at this temperature of 450° C., during which time the polyester resin component of the organic-inorganic coating composition decomposes or is burned out. The temperature of the oven is then increased to from about 600° C. to 700° C. over a period of about one hour and the potted transformer 30 is left in the oven for about 30 minutes at this temperature during which time the glass component of the inorganic wire insulation passes and the potting composition is cured. During this period air is flowed through the oven 32 and any volatile constituents are removed through stack 36.

During the heat treatment or cure above described the low-melting point lead-borate glass component of the potting composition fuses. The fused lead-borate glass and the constituents comprising the cement component react to form a glass or ceramic composition of higher melting point and good bond strength. The potted transformer is capable of operating continuously at temperatures of about 500° C. and higher. The cured potting composition, thoroughly impregnating the interstices within the transformer, has high insulating properties and physical properties, and further prevents any wire-to-wire cut through during the processing steps hereinabove described and during service.

*Example VII*

A stator 4 inches in cross-sectional diameter and adapted for use in a 2½ horsepower motor was wound with the coated silver wire of Example IV and then encapsulated with the ceramic potting composition in accordance with the method set forth hereinabove. The stator was placed within a rotor and the assembly was placed in an oven. The rotor was operated for 43 hours and 50 minutes during which time the temperature in the oven was about 450° C. The stator was subsequently removed from the rotor. The stator showed no substantial change electrically and there were no shorted turns of wire. There were no cracks in the encapsulant.

*Example VIII*

Another stator was prepared in the same manner as Example VII and vibrated between 0 and 2500 cycles per second at an amplitude of 30 g's. The encapsulant showed no signs of cracking or other damage.

The potting composition of this invention, in the form of a slurry, can be applied with simple vacuum equipment and at room temperature conditions. The potting composition, after application, will set to a hard, cohesive mass at room temperature. No special handling is required before cure or heat treatment. Upon heating to a temperature of about 600° to 650° C., as above described, there is formed a highly satisfactory encapsulant having good mechanical properties and good electrical properties.

It is to be understood that the above description and drawing are illustrative of the invention and not in limitation thereof.

I claim as my invention:

1. A ceramic potting composition comprising an intimate admixture of (1) from 70% to 80% by weight of a cement component consisting of (a) from 90% to 85% by weight of a finely divided refractory material selected from the group consisting of calcium silicate, barium silicate, magnesium silicate, titanium silicate, hafnium silicate, zirconium silicate, aluminum silicate, calcium aluminosilicate, magnesium aluminosilicate, and mixtures thereof, and (b) from 10% to 15% by weight of a binder composition consisting of from 25% to 50% by weight of finely divided magnesium oxide and from 75% to 50% by weight of finely divided ammonium dihydrogen phosphate, and (2) from 30% to 20% by weight of a finely divided lead-borate glass component consisting essentially of from about 10% to 20% by weight of boron oxide and from about 90% to 80% by weight of lead oxide.

2. A ceramic potting composition comprising an intimate admixture of (1) from 70% to 80% by weight of a cement component consisting of (a) from 90% to 85% by weight of finely divided zirconium silicate, and (b) from 10% to 15% by weight of a binder composition consisting of from 25% to 50% by weight of finely divided magnesium oxide and from 75% to 50% by weight of finely divided ammonium dihydrogen phosphate, and (2) from 30% to 20% by weight of a finely divided low melting point lead-borate glass component consisting essentially of about 15% by weight of boron oxide and about 85% by weight of lead oxide.

3. In the process of preparing an encapsulated electrical member, the electrical member comprising an electrical conductor with solid insulation applied thereto, the steps comprising potting the electrical member in a water-alcohol slurry of a ceramic potting composition comprising an intimate admixture of (1) from 70% to 80% by weight of a cement component consisting of (a) from 90% to 85% by weight of a finely divided refractory material selected from the group consisting of calcium silicate, barium silicate, magnesium silicate, titanium silicate, hafnium silicate, zirconium silicate, aluminum silicate, calcium aluminosilicate, magnesium aluminosilicate, and mixtures thereof, and (b) from 10% to 15% by weight of a binder composition consisting of from 25% to 50% by weight of finely divided magnesium oxide and from 75% to 50% by weight of finely divided ammonium dihydrogen phosphate, and (2) from 30% to 20% by weight of a finely divided lead-borate glass component consisting essentially of from about 10% to 20% by weight of boron oxide and from about 90% to 80% by weight of lead oxide, air-drying the applied potting composition to remove therefrom substantially all the water and alcohol, and heating the electrical member with applied potting composition to a temperature of from about 650° C. to 700° C. whereby is formed a hard tough encapsulant having good mechanical and electrical properties.

4. In the process of preparing an encapsulated electrical member, the electrical member comprising an electrical conductor with solid insulation applied thereto, the steps comprising potting the electrical member in a water-alcohol slurry of a ceramic potting composition comprising an intimate admixture of (1) from 70% to 80% by weight of a cement component consisting of (a) from 90% to 85% by weight of finely divided zirconium silicate, and (b) from 10% to 15% by weight of binder composition consisting of from 25% to 50% by weight of finely divided magnesium oxide and from 75% to 50% by weight of finely divided ammonium dihydrogen phosphate, and (2) from 30% to 20% by weight of a finely divided low melting point lead-borate glass component consisting essentially of about 15% by weight of boron oxide and about 85% by weight of lead oxide, air-drying the applied potting composition to remove therefrom substantially all the water and alcohol, and heating the electrical member with applied potting composition to a temperature of from about 650° C. to 700° C. whereby there is formed a hard tough encapsulant having good mechanical and electrical properties.

5. An insulated electrical member comprising an electrical conductor and a layer of inorganic encapsulant applied to at least the exterior surface thereof, said inorganic encapsulant being the heat reaction product of a composition comprising an intimate admixture of (1) from 70% to 80% by weight of a cement component consisting of (a) from 90% to 85% by weight of a finely divided refractory material selected from the group consisting of calcium silicate, barium silicate, magnesium silicate, titanium silicate, hafnium silicate, zirconium silicate, aluminum silicate, calcium aluminosilicate, magnesium aluminosilicate, and mixtures thereof, and (b) from 10% to 15% by weight of a binder composition consisting of from 25% to 50% by weight of finely divided magnesium oxide and from 75% to 50% by weight of finely divided ammonium dihydrogen phosphate, and (2) from 30% to 20% by weight of a finely divided lead-borate glass component consisting essentially of from about 10% to 20% by weight of boron oxide and from about 90% to 80% by weight of lead oxide.

6. An insulated electrical member comprising an electrical conductor and a layer of inorganic encapsulant applied to at least the exterior surface thereof, said inorganic encapsulant being the heat reaction product of a composition comprising an intimate admixture of (1) from 70% to 80% by weight of a cement component consisting of (a) from 90% to 85% by weight of finely divided zirconium silicate, and (b) from 10% to 15% by weight of a binder composition consisting of from 25% to 50% by weight of finely divided magnesium oxide and from 75% to 50% by weight of finely divided ammonium dihydrogen phosphate, and (2) from 30% to 20% by weight of a finely divided low melting point lead-borate glass component consisting essentially of about 15% by weight of boron oxide and about 85% by weight of lead oxide.

References Cited in the file of this patent

UNITED STATES PATENTS

| | | |
|---|---|---|
| 2,848,794 | Roth | Aug. 26, 1958 |
| 2,879,185 | King et al. | Mar. 24, 1959 |

FOREIGN PATENTS

| | | |
|---|---|---|
| 1,002,233 | Germany | Feb. 7, 1957 |